US008033010B2

(12) United States Patent
Wang et al.

(10) Patent No.: US 8,033,010 B2
(45) Date of Patent: Oct. 11, 2011

(54) CLUTCHING JIG

(75) Inventors: Chin-Chou Wang, Tu-Cheng (TW); Yi-Chang Yang, Tu-Cheng (TW)

(73) Assignee: Cheng UEI Precision Industry Co., Ltd., Tu-Cheng, Taipei Hsien (TW)

( * ) Notice: Subject to any disclaimer, the term of this patent is extended or adjusted under 35 U.S.C. 154(b) by 234 days.

(21) Appl. No.: 12/554,947

(22) Filed: Sep. 7, 2009

(65) Prior Publication Data

US 2011/0056072 A1 Mar. 10, 2011

(51) Int. Cl.
*B23P 19/00* (2006.01)
*B23P 21/00* (2006.01)
*B23Q 15/00* (2006.01)

(52) U.S. Cl. ................ 29/764; 29/721; 29/711; 29/700; 29/426.1; 29/426.6

(58) Field of Classification Search ................ 29/426.1, 29/426.5, 426.6, 564.1, 700, 711, 721, 764, 29/428
See application file for complete search history.

(56) References Cited

U.S. PATENT DOCUMENTS

| | | | | |
|---|---|---|---|---|
| 6,387,183 | B1 * | 5/2002 | Inaba et al. | 118/301 |
| 6,387,441 | B1 * | 5/2002 | Yang et al. | 427/164 |
| 6,884,292 | B2 * | 4/2005 | Yang et al. | 118/500 |
| 7,130,135 | B2 * | 10/2006 | Shimizu | 359/819 |
| 2002/0086103 | A1 * | 7/2002 | Yang et al. | 427/164 |
| 2005/0200033 | A1 * | 9/2005 | Kadota et al. | 264/1.31 |
| 2005/0254148 | A1 * | 11/2005 | Shimizu | 359/819 |
| 2007/0091262 | A1 * | 4/2007 | Watanabe et al. | 351/178 |
| 2007/0253077 | A1 * | 11/2007 | Ayame et al. | 359/811 |
| 2008/0158699 | A1 * | 7/2008 | Chen et al. | 359/819 |
| 2009/0019684 | A1 * | 1/2009 | Wu | 29/468 |
| 2009/0080094 | A1 * | 3/2009 | Chen | 359/819 |
| 2009/0103192 | A1 * | 4/2009 | Chang | 359/811 |

* cited by examiner

*Primary Examiner* — A. Dexter Tugbang
*Assistant Examiner* — David Angwin
(74) *Attorney, Agent, or Firm* — Cheng-Ju Chiang

(57) ABSTRACT

A clutching jig used to disassemble a lens socket and a lens component which has a lens base glued on a printed circuit board (PCB) and is fixed in the lens socket by a plurality of buckling pieces of the lens socket abutting on the lens component has a substantially rectangular base. The base defines two opposite first lateral surfaces, a bottom surface, and a slot passing through the first lateral surfaces and the bottom surface to divide the base into a first holding portion and a second holding portion. The bottom surface has a receiving recess communicating with the slot. When the receiving recess receives the lens component, a plurality of resisting slices attached to a periphery of the base inserts into a gap between the lens component and the lens socket for pressing the buckling pieces away from the lens component.

6 Claims, 5 Drawing Sheets

CLUTCHING JIG

BACKGROUND OF THE INVENTION

1. Field of the Invention

The invention relates to a clutching jig, and more particularly to a clutching jig for conveniently disengaging a lens component from a lens socket.

2. The Related Art

Referring to FIGS. 6-7, a lens module includes a lens component 80 and a lens socket 90 coupled with the lens component 80. The lens component 80 has a rectangular lens base 81 glued on a printed circuit board (PCB) 83 and a round lens body 82 disposed on the lens base 81. The lens base 81 is formed with four receiving grooves 811 at four corners thereof. The lens body 82 has a fool-proof projection 821 extended outwards from a side thereof. The lens socket 90 has an insulating housing 91 and a metal shell 92 enclosing a periphery of the insulating housing 91. The metal shell 92 is provided with buckling pieces 921, 922 at upper portions thereof. The buckling pieces 921, 922 are bent inwards to abut against bottoms of the corresponding receiving grooves 811 for preventing lens component 80 from removing out of the lens socket 90, and lean against the sides of the lens base 81 for preventing the lens component 80 from moving with respect to the lens socket 90, respectively.

Nevertheless, as the PCB 83 and the lens base 81 may have a relative movement therebetween or the glue for connecting with the PCB 83 and the lens base 81 is extruded to overflow and coagulate to form overflowing lumps attached to the outer sides of the PCB 83 or the lens base 81. In the process of disassembly, the lens component 80 can not be disengaged from the lens socket 90 because the buckling pieces 921, 922 rest against the projecting portion of the PCB 83 or the overflowing lumps. Therefore, it is desirable to design a clutching jig which has a simple structure and is capable of addressing the problem mentioned above.

SUMMARY OF THE INVENTION

An object of the present invention is to provide a clutching jig with a simple structure capable of disengaging a lens component from a lens socket easily. The clutching jig used to disassemble the lens socket and the lens component which has a lens base glued on a printed circuit board (PCB) and is fixed in the lens socket by a plurality of buckling pieces of the lens socket abutting on the lens component has a substantially rectangular base. The base defines two opposite first lateral surfaces, a bottom surface, and a slot passing through the opposite first lateral surfaces and the bottom surface to divide the base into a first holding portion and a second holding portion. The bottom surface has a receiving recess at a center portion thereof and communicating with the slot. A plurality of resisting slices attach to a periphery of the base, with bottom ends thereof extending beyond the bottom surface of the base. The receiving recess receives the lens component. The resisting slices are inserted into a gap between the lens component and the lens socket for pressing the buckling pieces away from the lens component, with the bottom ends of the resisting slices extending inwards beyond a junction of the lens base and the PCB. The first holding portion and the second holding portion are urged to approach each other to lessen a circumferential dimension of the receiving recess for clutching the lens component.

As described above, the resisting slices inserted into the gap between the lens component and the lens socket substantially surround on the whole periphery of the lens component, with the bottom ends thereof extending inwards beyond the junction of the base and the PCB, which makes the lens component be easily released from the fastening of the buckling pieces of the lens socket. Afterwards, the first holding portion and the second holding portion are urged to approach each other for holding the lens component out of the lens socket. Furthermore, the structure of the clutching jig will be simple and compact, which can shorten the manufacturing time and lower the cost, fit for wider applications.

BRIEF DESCRIPTION OF THE DRAWINGS

The present invention will be apparent to those skilled in the art by reading the following description thereof, with reference to the attached drawings, in which.

DETAILED DESCRIPTION OF THE PREFERRED EMBODIMENT

Figure 1:
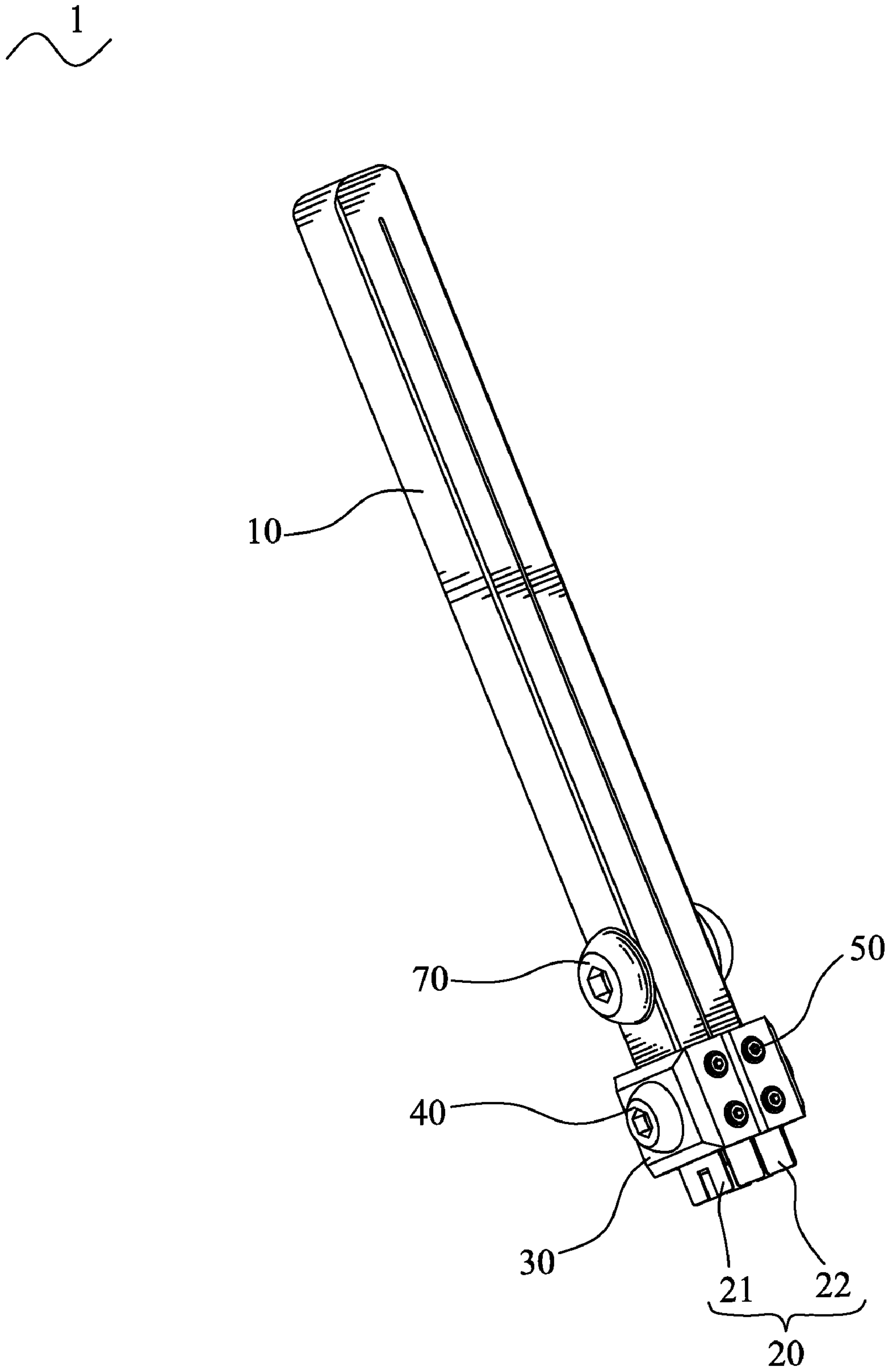
FIG. 1 is an assembled, perspective view of a clutching jig of an embodiment according to the present invention.
Figure 2:
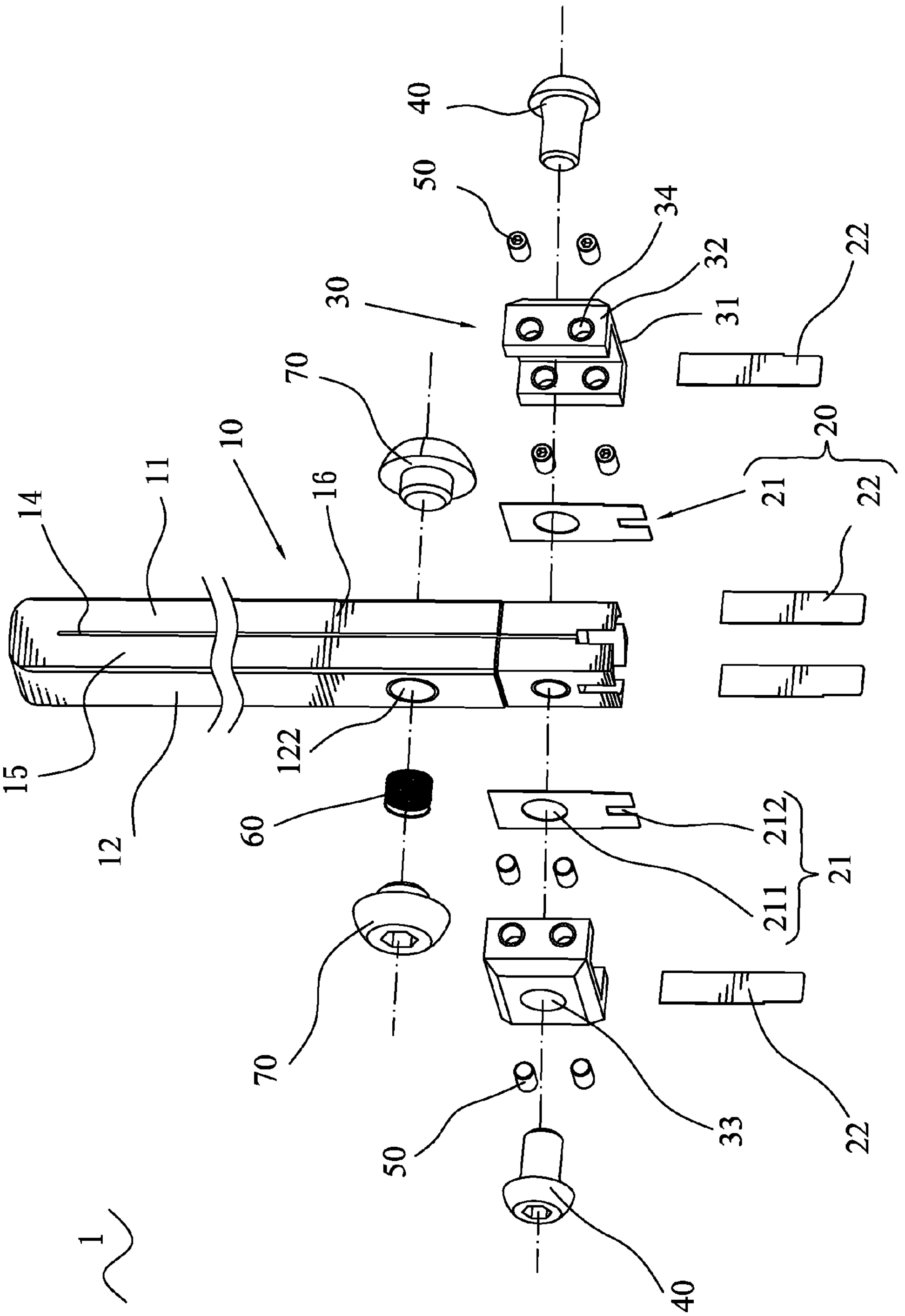
FIG. 2 is an exploded, perspective view of the clutching jig shown in FIG. 1.

Referring to FIG. 1 and FIG. 2, a clutching jig 1 according to the present invention includes a rectangular base 10, a plurality of resisting slices 20, two fixing elements 30, two retaining screws 40, a plurality of clamping screws 50, a spring 60 and two limiting screws 70.

Figure 3:
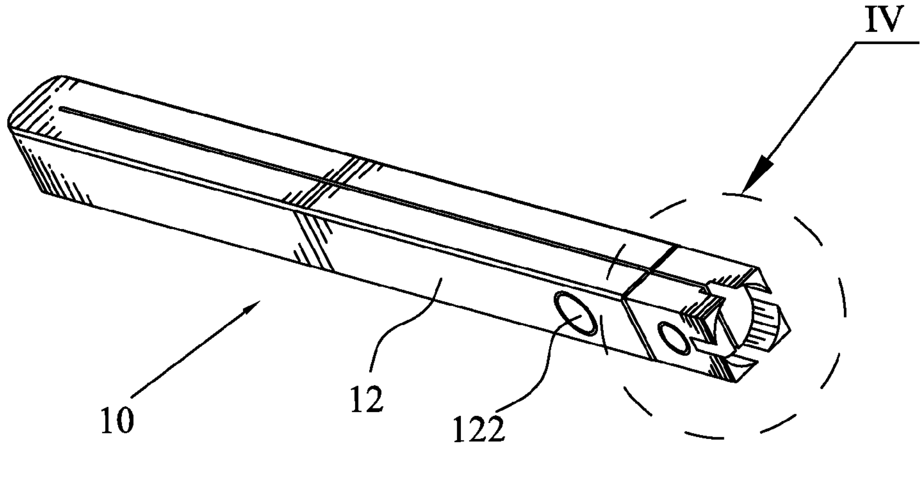
FIG. 3 is a perspective view of a base of the clutching jig shown in FIG. 1.
Figure 4:
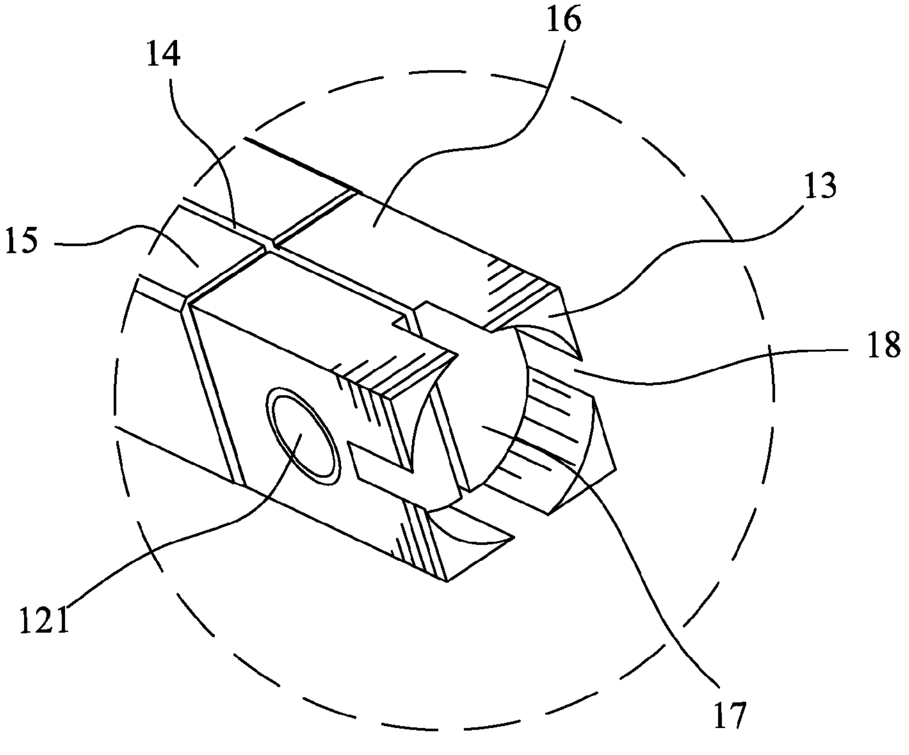
FIG. 4 is a partly enlarged view showing an enlarged IV portion of FIG. 3.
Figure 5:
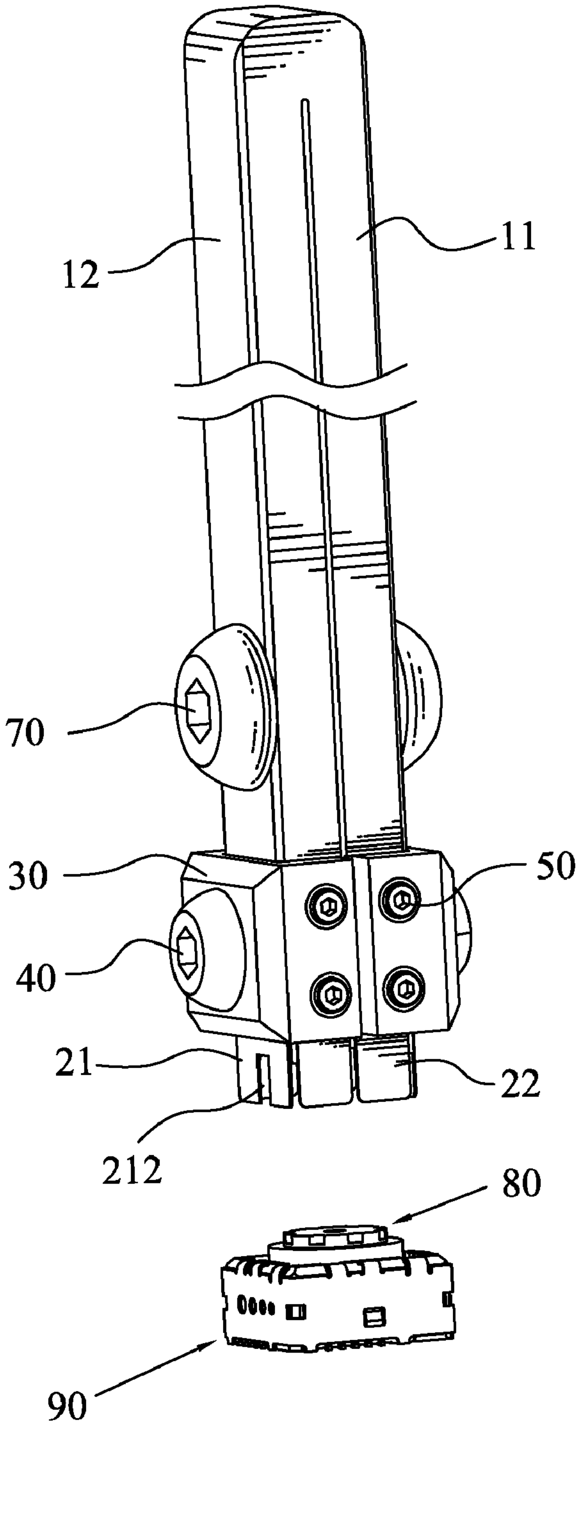
FIG. 5 is a perspective view of the clutching jig shown in FIG. 1, wherein a lens module is provided which includes a lens component and a lens socket.
Figure 6:
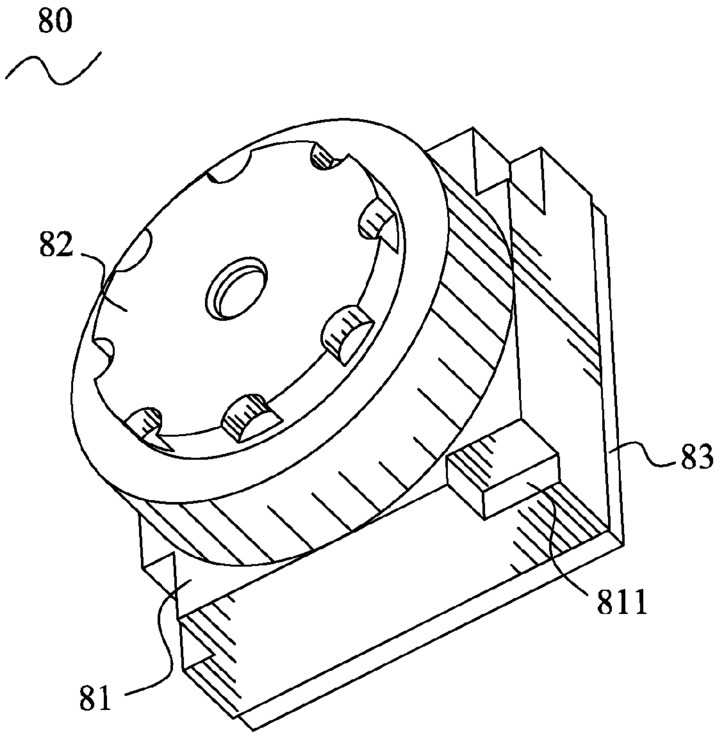
FIG. 6 is a perspective view of the lens component shown in FIG. 5.
Figure 7:
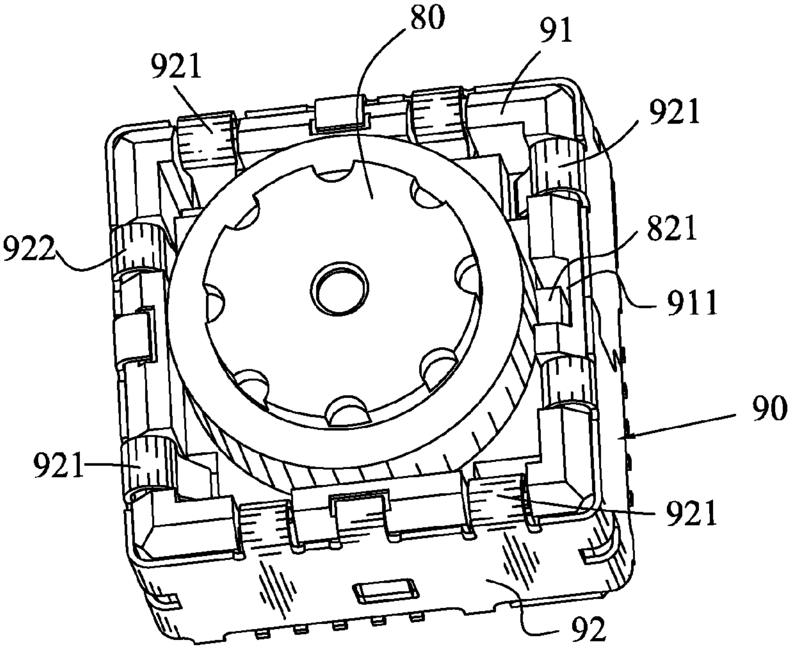
FIG. 7 is a perspective view of the lens module showing in FIG. 5 seen from another view.

Referring to FIG. 2, FIG. 3 and FIG. 4, the base 10 defines two opposite first lateral surfaces 11, two opposite second lateral surfaces 12, a bottom surface 13, and has a slot 14 at a middle portion of the first lateral surface 11 along an up and down direction. The slot 14 passes through the whole base 10 along a direction perpendicular to the first lateral surfaces 11 and reaches the bottom surface 13 to divide the base 10 into a first holding portion 15 and a second holding portion 16. The bottom surface 13 is formed with a circular receiving recess 17 at a middle portion thereof, communicating with the slot 14. Each sidewall of the receiving recess 17 defines a fool-proof gap 18 at a substantially middle portion thereof. Each of the second lateral surfaces 12 has a fixing hole 121 at a lower portion thereof and a limiting hole 122 above the fixing holes 121. In this embodiment, the two fixing holes 121 are in alignment with each other. The two limiting holes 122 are in alignment and communicate with each other.

The resisting slices 20 includes two rectangular first resisting slices 21 and a plurality of second resisting slices 22 of strip shape. Each of the first resisting slices 21 has a mounting hole 211 at a substantially middle portion thereof, and a mating gap 212 at a lower portion and reaching a bottom edge thereof, corresponding to the fixing hole 121 and the fool-proof gap 18 of the base 10, respectively.

Each of the fixing elements 30 has a rectangular base board 31 and a pair of lateral wings 32 extended perpendicularly to the base board 31 from two opposite sides of the base board 31. A through hole 33 is formed at a middle of the base board 31. Each of the lateral wings 32 has a plurality of apertures 34.

Please refer to FIG. 1 to FIG. 5, in assembly, the spring 60 is received in the limiting holes 122, and the two limiting screws 70 is fixed into the respective limiting holes 122 and rest against two ends of the spring 60, which makes the first holding portion 15 and the second holding portion 16 automatically depart from each other after the first holding portion 15 and the second holding portion 16 being urged to approach each other. The retaining screw 40 passes through the through hole 33 of the fixing element 30, and the mounting hole 211 of the first resisting slice 21 to engage with the fixing hole 121, for fixing the fixing element 30 and the first resisting slice 21 to the base 10. A bottom edge of the first resisting slice 21 exceeds a bottom edge of the second lateral surface 12 some distance. The lateral wing 32 is attached to the first lateral surface 11, with the second resisting slice 22 sandwiched therebetween by means of the clamping screw 50 received in the aperture 34. A bottom edge of the second resisting slice 22 exceeds a bottom edge of the first lateral surface 11 and is substantially flush with the bottom edges of the first resisting slices 21.

Referring to FIGS. 1-7, when the clutching jig 1 is used to disengage the lens component 80 from the lens socket 90, the clutching jig 1 is firstly adjusted and positioned by the fool-proof projection 821 inserted into the fool-proof gap 18. The lens body 82 is received in the receiving recess 17. The resisting slices 20 are inserted into the gap between the lens component 80 and the lens socket 90 and push the buckling pieces 921, 922 away from the lens component 80. In this embodiment, the length of the resisting slices 20 is substantially the same as the depth of a chamber of the insulating housing 91. That is, when the clutching jig 1 is inserted into the lens module, distal ends of the resisting slices 20 extend inwards beyond a junction of the lens base 81 and the PCB 83, which prevents the buckling pieces 921, 922 from abutting the overflowing lumps or the projecting portion of the PCB 83. Thus the lens component 80 will be released by the buckling pieces 921, 922 of the lens socket 90. At this time, the first and the second holding portions 15, 16 are gripped to approach each other to clutch the lens component 80, and pulled upwardly with the lens component 80, disengaging the lens component 80 from the lens socket 90.

As describe above, the resisting slices 20 inserted into the gap between the lens component 80 and the lens socket 90 substantially surround on the whole periphery of the lens component 80, with the bottom ends thereof extending inwards beyond the junction of the lens base 81 and the PCB 83, which makes the lens component 80 be released from the fastening of the buckling pieces 921, 922 of the lens socket 90, easily. Afterwards, the first holding portion 15 and the second holding portion 16 are urged to approach each other for holding the lens component 80 out of the lens socket 90.

Furthermore, the present invention is not limited to the embodiment described above; various additions, alterations and the like may be made within the scope of the present invention by a person skilled in the art. For example, respective embodiments may be appropriately combined.

What is claimed is:

1. A clutching jig used to disassemble a lens socket and a lens component which has a lens base glued on a printed circuit board (PCB) and is fixed in the lens socket by a plurality of buckling pieces of the lens socket abutting on the lens component, comprising:

a substantially rectangular base, the base defining two opposite first lateral surfaces, a bottom surface, and a slot passing through the opposite first lateral surfaces and the bottom surface to divide the base into a first holding portion and a second holding portion, the bottom surface having a receiving recess at a center portion thereof and communicating with the slot; and a plurality of resisting slices attached to a periphery of the base, with bottom ends thereof extending beyond the bottom surface of the base;

wherein the receiving recess receives the lens component, the resisting slices are inserted into a gap between the lens component and the lens socket for pressing the buckling pieces away from the lens component, with the bottom ends of the resisting slices extending inwards beyond a junction of the lens base and the PCB, the first holding portion and the second holding portion are urged to approach each other to lessen a circumferential dimension of the receiving recess for clutching the lens component.

2. The clutching jig as claimed in claim 1, further comprising two fixing elements, each of the fixing elements having a base board attached to one of two opposite second lateral surfaces of the base connecting with the first lateral surfaces, the resisting slices having two first resisting slices sandwiched between the base boards and the second lateral surfaces.

3. The clutching jig as claimed in claim 2, wherein the base board has two opposite sides extended perpendicularly to form two lateral wings attached to the first lateral surfaces of the base, the resisting slices has a plurality of second resisting slices, the second resisting slices are sandwiched between the lateral wings and the first lateral surfaces of the base.

4. The clutching jig as claimed in claim 3, wherein each of the lateral wings has a plurality of apertures, each of the second resisting slices is fixed between the lateral wing and the first lateral surface by means of a clamping screw received in the aperture.

5. The clutching jig as claimed in claim 2, wherein the second lateral surface has a fixing hole at a lower portion thereof, the base board has a through hole, the first resisting slice is formed with a mounting hole, a retaining screw passes through the through hole, and the mounting hole to engage with the fixing hole, for fixing the base board and the first resisting slice to the second lateral surface.

6. The clutching jig as claimed in claim 1, wherein each of the first holding portion and the second holding portion has a fixing hole at a lateral surface thereof contiguous to the first lateral surfaces and extending perpendicular to the slot, the fixing holes are in alignment with and communicate with each other to receive a spring for automatically departing the first holding portion from the second holding portion after forcing to approach each other.

* * * * *